(No Model.)

P. H. HUTCHINSON, Jr.
THRUST BEARING.

No. 566,178. Patented Aug. 18, 1896.

Witnesses
J. Gregg Poole
Henry N. Copp

Inventor
Philip H. Hutchinson, Jun.
By Attorney Herbert W. T. Jenner.

THE NORRIS PETERS CO., PHOTO-LITHO., WASHINGTON, D. C.

UNITED STATES PATENT OFFICE.

PHILIP H. HUTCHINSON, JR., OF STONO, SOUTH CAROLINA.

THRUST-BEARING.

SPECIFICATION forming part of Letters Patent No. 566,178, dated August 18, 1896.

Application filed July 24, 1895. Serial No. 556,974. (No model.)

*To all whom it may concern:*

Be it known that I, PHILIP H. HUTCHINSON, Jr., a citizen of the United States, residing at Stono, in the county of Berkeley and State of South Carolina, have invented certain new and useful Improvements in Thrust-Bearings; and I do hereby declare the following to be a full, clear, and exact description of the invention, such as will enable others skilled in the art to which it appertains to make and use the same.

This invention relates to thrust-bearings for shafts; and it consists in the novel construction and combination of the parts hereinafter fully described and claimed.

Figure 1:
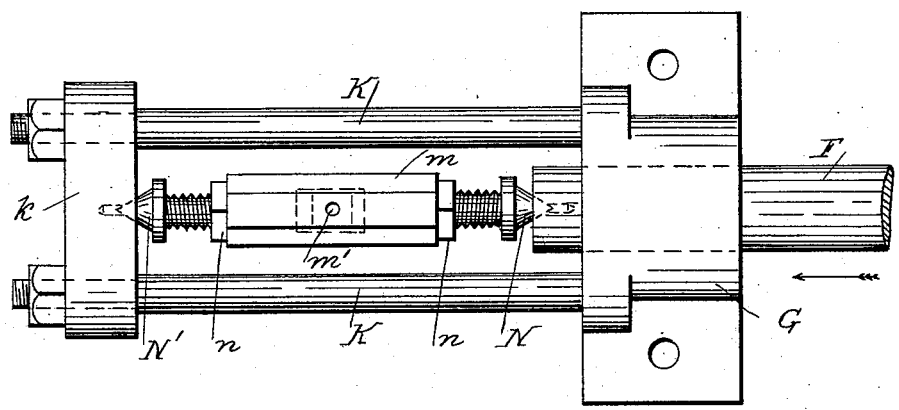
Figure 2:
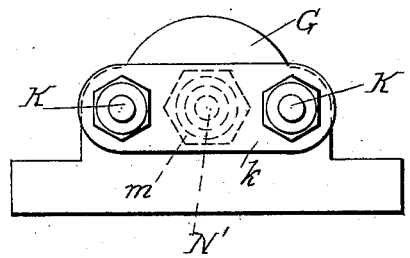
Figure 3:
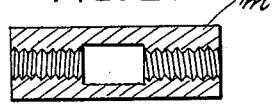

In the drawings, Figure 1 is a plan view of a thrust-bearing. Fig. 2 is an end view of the same, and Fig. 3 is a longitudinal section through the screw-threaded sleeve.

F is an ordinary revolving shaft subjected to end thrust in the direction of the arrow.

G is a bearing for the shaft and is of any approved construction. A stationary abutment or cross-piece $k$ is provided beyond the end of the shaft.

K are two rods for supporting the cross-piece from the bearing G, but the cross-piece may be supported in any other approved manner.

The thrust-bearing is interposed between the end of the shaft and the abutment. A long rectangular nut or screw-threaded sleeve $m$ is provided, and the screw-threads are cut in opposite directions at the opposite ends of the nut. The center portion of the nut is provided with an air-hole $m'$.

N and N' are conical centers provided, respectively, with right and left hand screw-threaded stems which engage with the ends of the nut $m$. Jam-nuts $n$ are provided on the stems of the centers for locking them in position after they have been adjusted. The centers engage with conical center holes in the end of the rod or shaft F and in the cross-piece $k$, and the thrust-bearing is set up from time to time as required.

What I claim is—

The combination, with a revoluble shaft, and a stationary abutment, each provided with a conical center hole; of a thrust-bearing interposed between the said parts and comprising two conical centers provided respectively with right and left hand screw-threaded stems, a revoluble screw-threaded sleeve engaging with the said stems, and jam-nuts screwed on the said stems and bearing against the ends of the sleeve, substantially as set forth.

In testimony whereof I affix my signature in presence of two witnesses.

PHILIP H. HUTCHINSON, JR.

Witnesses:
W. C. VENNING, Jr.,
CHAS. F. HARD, JR.,